United States Patent [19]
Kapel et al.

[11] 3,763,325
[45] Oct. 2, 1973

[54] MAIN DISTRIBUTING FRAME MANUAL SWITCHING NETWORK ARRANGEMENT

[75] Inventors: Joseph George Kapel, Middletown, N.J.; Wayne Eugene Nichols, Granville, Ohio; Charles William Zebe, New Shrewsbury, N.J.

[73] Assignee: Bell Telephone Laboratories, Incorporated, Murray Hill, N.J.

[22] Filed: June 29, 1971

[21] Appl. No.: 158,012

[52] U.S. Cl. .............. 179/98, 179/18 F, 179/18 GE
[51] Int. Cl. .............................................. H04q 3/64
[58] Field of Search ....................... 179/18 F, 18 FA, 179/18 GE, 18 GF, 18 G, 27 R, 27 B, 98, 1 B, 18 AG; 178/DIG. 13; 317/101 CM, 101 C X, 101 D, 117

[56] References Cited

UNITED STATES PATENTS

| | | | |
|---|---|---|---|
| 3,585,310 | 6/1971 | Gueldenpfennig | 179/18 GF |
| 3,324,249 | 6/1967 | Cotroneo | 179/18 GE |
| 3,562,435 | 2/1971 | Joel | 179/98 |

*Primary Examiner*—Kathleen H. Claffy
*Assistant Examiner*—David L. Stewart
*Attorney*—W. L. Keefauver

[57] ABSTRACT

A telephone system comprising conventional station apparatus (outside plant) and associated conductors and conventional central office equipment (inside plant) and associated conductors is provided with a main distributing frame cross-connection field which is modified by the serial insertion of a multistage manual switching network between the cross-connection field input and output terminals. The network consists of a plurality of serially related switching stages comprising a plurality of terminals each of which are exclusively interconnected with respective terminals in a preceding stage in a previously wired predetermined pattern. Terminal strips are employed at each stage in lieu of the more conventional network stage switches. Connection through each stage is effected by placement of a short double ended cord, thereby interconnecting any selected input terminal and output terminal of a particular switch.

Independent data processing equipment is employed to maintain in memory the status of each connection and to indicate, upon request, the cord placements (and removals) required to perform the main distributing frame function.

1 Claim, 4 Drawing Figures

INVENTORS J. G. KAPPEL
W. E. NICHOLS
C. W. ZEBE
BY Brendan A. Ward
ATTORNEY

FIG. 2
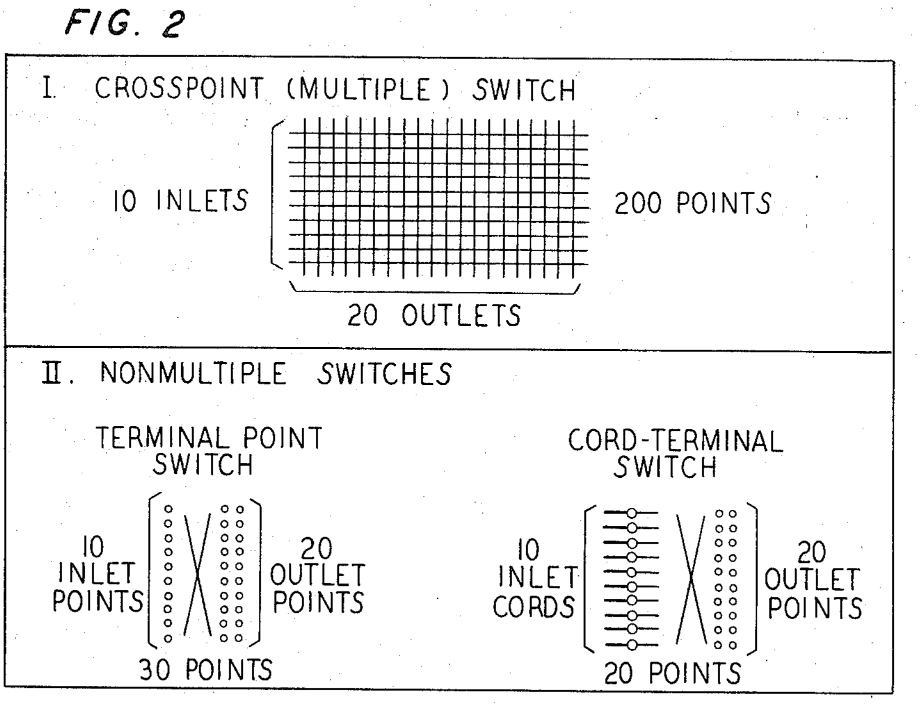
FIG. 3 FIVE STAGE NETWORK AT MAXIMUM SIZE
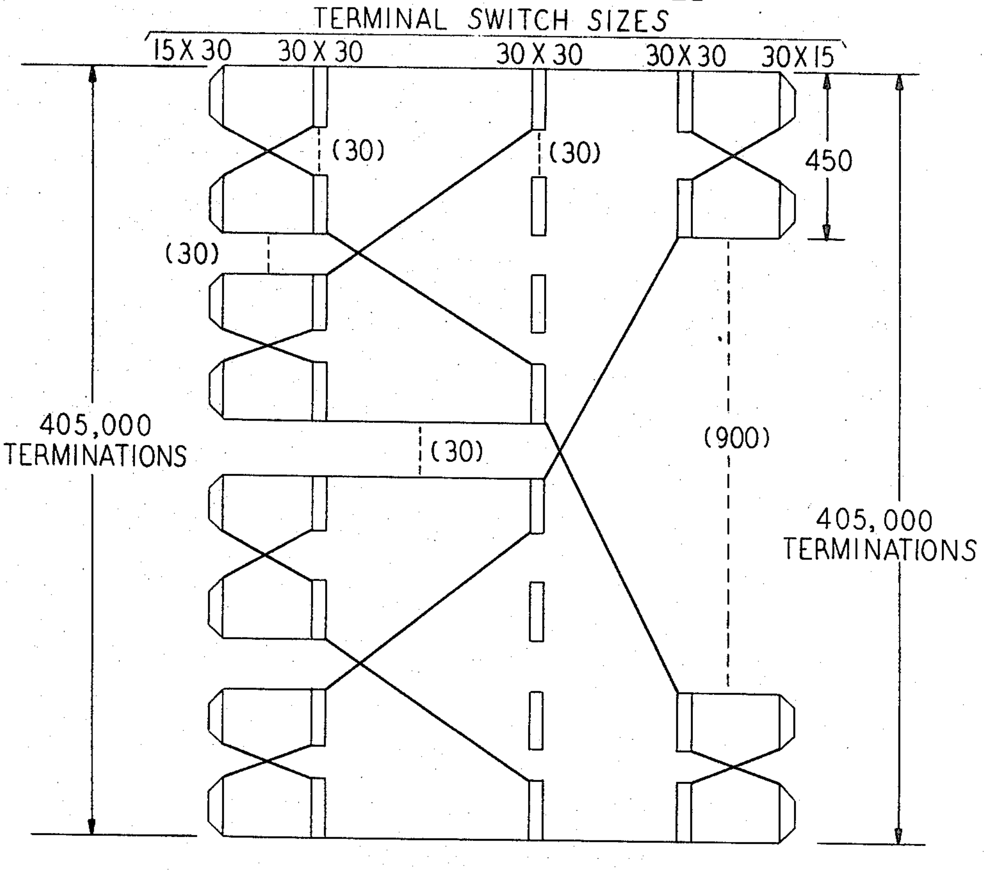

FIG. 4

MULTISTAGE DISTRIBUTING NETWORKS
GROWTH PATTERNS AND TERMINAL COUNTS

| TOTAL MAXIMUM INLETS | SWITCH SIZES | | | TERMINALS PER INLET |
| --- | --- | --- | --- | --- |
| | 1ST & LAST STAGES | CENTER STAGE | INTERMEDIATE STAGES | |
| 5-STAGE NETWORK | | | | |
| 27,000 | 15 X 30 | 10 X 10 | 30 X 30 | 34 |
| 67,000 | 15 X 30 | 10 X 10 | 30 X 30 | 22 |
| 135,000 | 15 X 30 | 10 X 10 | 30 X 30 | 18 |
| 270,000 | 15 X 30 | 20 X 20 | 30 X 30 | 18 |
| 405,000 | 15 X 30 | 30 X 30 | 30 X 30 | 18 |
| 3-STAGE NETWORK | | | | |
| 8,000 | 160 X 200 | 50 X 50 | - | 7 |
| 16,000 | 160 X 200 | 100 X 100 | - | 7 |
| 48,000 | 160 X 200 | 300 X 300 | - | 7 |
| 64,000 | 160 X 200 | 400 X 400 | - | 7 |

MAIN DISTRIBUTING FRAME MANUAL SWITCHING NETWORK ARRANGEMENT

BACKGROUND OF THE INVENTION

1. Field of the Invention

This invention relates to cross-connection field arrangements and particularly to switching system main distributing frame network arrangements.

2. Description of the Prior Art

The adoption of the principle of centralization of common switching equipment produced the need to provide flexibility of interconnection between outside cable plant and central office equipment. Thus, a main distributing frame evolved which provides terminations for outside plant cable pairs on a fixed basis on one side of the frame with similar terminations for inside plant conductors on the other side of the frame. Wire cross connections, manually placed, then connect the desired central office circuit to the proper outside plant cable pair. Accordingly, the main distributing frame, in essence, constitutes a cross-connection field which increases in size in direct relation to office size. Although substantial technological improvements have occurred in automatic switching systems in intervening years, the basic main distributing frame design presently in use throughout the world has not changed in over half a century.

The retention of the original main distributing frame arrangement is attributable, in part, to certain advantages which it presents. For example, it is completely nonblocking in nature. Thus, any particular outside plant cable pair is capable of physical connection through to an appropriate central office circuit by placing an additional cross-connection pair. The physical termination of conductors also provides a convenient point for maintenance test access. In addition, the physical equipment of which the main distributing frame is constructed consists principally of iron work and terminal strips, thus constituting a relatively low plant investment. However, these factors are no longer sufficiently advantageous when it is recognized that, although the plant investment is low, the continuing need for investment in labor is extremely high. In addition, existing main distributing frame arrangements in many cases have grown far beyond their initially estimated sizes, thus forcing unreasonable measures to be taken to provide the necessary capacity. Massive reterminations, the physical requirement that portions of the distributing frame be segregated and interconnected with large cross-connection tie cables, and the phenomenal growth of individual switching system offices have contributed to maintenance problems, which in some instances have rendered many cross-connection changes impossible or at least prohibitively expensive. And, finally, cross-connection jumper congestion, massive record-keeping problems and the limitation of access for test purposes further compounds the disadvantages in view of the physical complexity of present day distributing frames.

U. S. Pat. No. 3,562,435, issued Feb. 9, 1971 to A. E. Joel, Jr. teaches a switching system arrangement in which the main distributing frame function is automated through implementation of an automatically controlled rearrangeable switching network. Although the Joel teaching constitutes a substantial advance in the art, the plant investment required thereby is substatially higher than that of the equipment which it replaces. Therefore, from an economic standpoint, the Joel disclosure is more readily applicable to new installations or to existing installations where recurring investment for labor is relatively high.

Accordingly, a need exists in the art for an arrangement which will obviate the high investment in labor necessary to perform the main distributing frame function in wire centers. A need also exists for an arrangement which will permit the main distributing frame function to continue to be performed with complete flexibility of interconnection but without requiring a large increase in plant investment. A need also exists for an arrangement which will perform the main distributing frame function in a manner which is adaptable to any switching system office irrespective of the type of office involved, and which may be readily implemented in such offices on an in-service basis.

SUMMARY OF THE INVENTION

In the exemplary embodiment, a central office is provided with a main distributing frame cross-connection field having a plurality of input appearance terminals and a plurality of output appearance terminals. Outside plant conductors are terminated on the input appearance terminals while central office circuit facilities are terminated on the output appearance terminals. The cross-connection field is modified by the serial insertion of a multistage manual switching network between the input appearance terminals and the output appearance terminals. The network consists of a plurality of serially related switching stages comprising a plurality of terminals, each of which are exclusively interconnected with respective terminals in a preceding stage in a previously wired, predetermined pattern. Thus, terminal blocks (terminal strips) may be used at each stage in lieu of the conventional network stage switches. Connection through each stage is effected by placement of a short double ended cord thereby interconnecting any selected switch input terminal and output terminal. Independent data processing equipment is employed to maintain in memory the status of each connection and to indicate, upon request, the placement of cords required to perform the main distributing frame function.

In accordance with one feature of our invention, a main distributing frame is modified by the serial insertion of a multistage manual switching network operable to interconnect outside plant cable conductors and central office circuits by the placement of a series of short cords.

Another feature of our invention is the provision of independent means, which in conjunction with the above is operable to maintain in memory the status of existing paths through the network and to indicate upon request the placement of cords required to perform the main distributing frame function.

BRIEF DESCRIPTION OF THE DRAWINGS

The foregoing objects, features and advantages, as well as others, of the invention will be more apparent from a description of the drawing, in which:

FIGS. 2 through 4 show in more detail the functioning of the exemplary embodiment.

GENERAL DESCRIPTION

Figure 1:
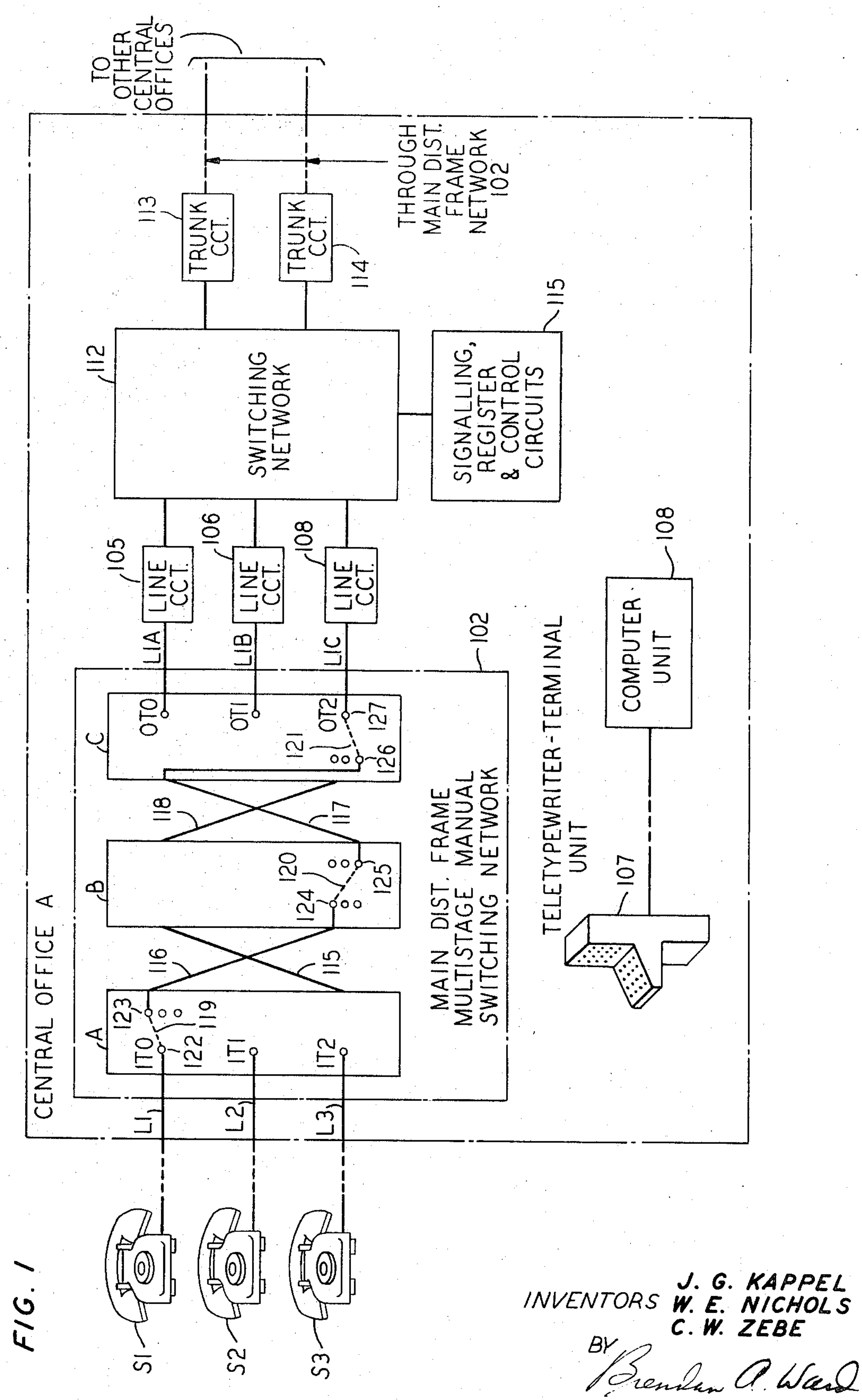
FIG. 1 is a block diagram showing the interrelationship of various components of an illustrative embodiment of our invention.

Referring now to FIG. 1, it is intended that the apparatus shown thereon is associated with a building (wire center) containing one or more conventional telephone central offices. It is further intended that the central office comprises a switching network 112 for terminating trunks 113 and 114 and line circuits 105, 106, and 108, and the usual control circuitry, such as signaling, register and control circuit 115 which are necessary to establish communications paths between telephone stations. The distinction within the conventional central office is the replacement of the well-known main distributing frame with the main distributing frame multistage manual switching network 102 and the addition of teletypewriter-terminal unit 107 and congestion unit 108 as shown in FIG. 1.

For purpose of the embodiment we shall assume that stations S1, S2 and S3 are conventional telephone stations whose conductors are terminated on switching network 102 and further that line circuits 105, 106 and 108 are also terminated on switching network 102 and comprise circuitry well known in the art operable to recognize off-hook and on-hook signals from telephone stations.

Teletypewriter-terminal unit 107 which is mechanically and electrically distinct from network 102 may comprise any number of configurations well known in the art operable to electrically transmit information in coded form to computer unit 108 and to provide a printed indication of coded information received from computer unit 108. It will be apparent from that which is contained hereinafter that, although teletypewriter-terminal unit 107 is utilized to transmit and receive information relative to the establishment of connections through switching network 102, in fact, numerous other information transmitting and receiving apparatus, automatic or manual, may be employed for this purpose. As will also be apparent from that which is contained hereinafter, computer unit 108, which may comprise any one of a number of configurations well known in the art, is arranged to accept the coded information from teletypewriter-terminal unit 107 and is further arranged to provide storage in memory of the current status of existing connections currently effective in network 102. It also will be obvious from that which is contained hereinafter that, although only one switching network is discussed in detail, the proposed circuit blocks 107 and 108 may, in fact, be arranged to provide information for a plurality of similar switching networks in other central offices or wire centers by application of the principles of our invention as hereinafter set forth.

Proceeding now with the description, an examination of switching network 102 as shown on FIG. 1 reveals that stations S1, S2 and S3 are connected via two conductor circuits L1, L2, and L3 to input terminals IT0, IT1 and IT2, respectively. Line circuits 105, 106 and 108 are respectively associated with output terminals OT0, OT1, and OT2 of switching network 102.

We shall assume that the traffic and circuit considerations require the association of input terminals IT0, IT1, and IT2 with output terminals OT2, OT1, and OT0, respectively. When this is effected, station S1 will be connected via a connection extending through network 102 to output terminal OT2, to line circuit 108. In similar fashion station S2 will be associated via a connection through network 102, through to output terminal OT1 to line circuit 106. And in similar fashion station S3 is connected through to line circuit 105 via output terminal OT0.

For purpose of the embodiment, we shall assume that, in a manner to be set forth more specifically hereinafter, switching network 102 is operable to interconnect several thousand two conductor circuits (not shown). We shall further assume that the majority of such circuits have already been interconnected, and that now it is desired to interconnect circuits L1, L2, L3 with circuits L1C, L1A, and L1B, respectively.

Information is thereupon transmitted from teletypewriter-terminal unit 107 identifying the individual circuits to be interconnected, coupled with the request for information identifying those terminals on switching stages A, B, C which are effective to provide continuity through network 102 for this purpose.

By way of specific illustration, the interconnection of station S1 and line circuit 108 may be effected by the placement of short cords (or jumper) 119, 120, and 121 in stages A, B, and C respectively. Accordingly, the established connecting path extends from station S1 via conductor L1 to terminal 122 on stage A, thence via jumper 119 to terminal 123, via the mounted conductor through cable 116 to terminal 124 in stage B, via jumper 120, terminal 125, and the associated cable 117 through to stage C, via terminal 126, jumper 121, and terminal 127 to line circuit 108. The aforedescribed connecting path may obviously consist of two or more parallel paths (i.e., T and R conductors). The interconnection of the remaining input and output terminals would occur in a manner substantially similar to that described above.

As will be apparent from that which is contained hereinafter, a craftsman thus interconnects only the designated terminals within each stage in order to effect the connection through the network. As also described hereinafter, the number of short cords to be placed is equal to the total number of switching stages. However, the interconnection between stages of the network is accomplished in a predetermined pattern as symbolically represented by cables 115, 116, 117, and 118 upon initial installation thereby obviating the need for the placement of any interconnection other than the short cords (a jumper) at each stage as above set forth.

DETAILED DESCRIPTION

In commencing the detailed description, the basic concept of multistage switching is first reviewed to illustrate its application to the distributing frame function.

If N inlet terminals are to have full access connection capability with M outlets, a single-stage switching array of the coordinate switch type requires N × M connection points — commonly known as crosspoints. For distributing frame applications, N ≅ M, so a logical design is a two-sided "square" array. The word "terminal" is used herein interchangeably with "inlet" or "outlet", when it is clear which side of a two-sided switching array is being discussed. "Terminal" also means "terminal pair," "terminal triplet" or "terminal quad," since the number of wires used to make a connection has no effect on remarks made with respect to configuration layouts.

Since the single-stage coordinate (crosspoint) switch requires N crosspoints per inlet terminal for an N × N matrix, its size and to a large extent its cost will vary as the square of the number of inlet (= outlet) terminals to be equipped. The simplest type of multistage array consists of $s$ stages of $n \times n$ switches, arranged so that there is exactly one path from each inlet to each outlet. There are $sn$ crosspoints per inlet, and $sn << N$ for a large array, so that the crosspoint savings over a single-stage matrix is generally quite large.

As an example, consider an $s$ = three-stage array of $n \times n = 10 \times 10$ switches, with $N = n^s = 10^3 = 1000$. There are only $3 \times 10 = 30$ crosspoints per inlet, as opposed to 1,000 crosspoints per inlet in a 1,000 × 1,000 single-stage array.

However, a multistage array that provides only one path connecting inlet-outlet pairs will have a higher congestion level than if some number K of (possible) paths through the network for each inlet-outlet pair is provided to insure that arbitrary terminals can still be connected together when a large fraction of the terminals are already connected. This cuts the accessibility of a multistage network by the factor 1/K; however, the savings over a single-stage array is still very large. Consider a six-stage network of 10 × 10 switches, with $K = 100$ possible paths for each inlet-outlet pair. $N = n^s/K = 10^6/100 = 10,000$. Thus, the crosspoint/terminal count is $sn = 60$ as opposed to 10,000 for a single-stage array.

In the well-known automatic switching systems, this substantial saving in hardware (connecting points) is the fundamental reason for using a multistage network. There is a partially offsetting control cost penalty, associated with link selection and switch operation in a multistage array, and the magnitude of this will in general determine the actual number of stages used.

The instant embodiment of the invention entails the use of terminal switches, arranged to form a multistage manually operated network. As will be apparent from that which is contained hereinafter, the economic balance between hardware and control is reversed as contrasted with the aforesaid well-known automatic switching system. The end result is an extremely efficient and economic arrangement.

A number of different types of switches have evolved over the years for use in multistage switching networks. The crosspoint switch, referred to earlier herein, is currently employed in the majority of such networks. As will be apparent from the following, a terminal switch of the type proposed herein presents substantial advantages over the conventional crosspoint switch for a general distributing network application as set forth in the embodiment.

THE CROSSPOINT SWITCH

The distinguishing features of the crosspoint switch is the internal multiple appearance of inputs and outputs. For example, in a 10-input to 20-output switch, the 10 inputs are multipled over the 20 outputs. The total connection points thereby number 10 × 20 or 200 of which only 10 can be in use at any given time. Thus, a fully occupied 10 by 20 switch is 95 percent unused.

Despite the apparent low efficiency of crosspoint switches, they are satisfactory for large, full access automatic call switching networks, for two reasons: (1) they are readily adapted to automatic control and (2) call switching involves very large numbers of short holding time connections so that high utilization of connection points occurs over a period of time.

However, connection rates and holding times for distributing frame networks, as proposed herein, and call switching networks are substantially different. The very low connect rates and extremely long holding times involved in the distributing function make the low connection point utilization inherent in a crosspoint switch a relatively constant long term effect. Many connection points would not be used for many years. Some would never be used. This long term low utilization results in an inefficient provision of connection points with associated space and cost penalties. In similar fashion, there would be corresponding penalties in control circuitry for automatic network operation.

THE TERMINAL SWITCH

A terminal switch as set forth herein is one having only input and output terminals (no multiple) and its advantages, relative to a crosspoint structure, are its simplicity and an order of magnitude fewer connection points. FIG. 2 illustrates two basic types of terminal switches and an equivalent crosspoint switch. The difference in the number of connection points required for terminal switches and crosspoint switches is shown in the following tabulation:

No. of Connection Points

| Switch Size | Crosspoint Switch | Terminal Point Switch | Cord - Terminal Switch |
|---|---|---|---|
| 10:10 | 100 | 20 | 10 |
| 25:25 | 625 | 50 | 25 |
| 50:50 | 2,500 | 100 | 50 |
| 80:100 | 8,000 | 180 | 100 |
| 100:100 | 10,000 | 200 | 100 |

For the prior art distributing frame with N vertical and N horizontal terminals, the frame lineup length is directly proportional to N, for an arbitrary but uniform terminal density. If the frame length is N and random assignment is practiced, the average jumper length (inlet-to-outlet connection length) is N/3 since two random points on a line of unit length are, on the average, one-third of a unit part. Thus, for large N, jumpers are generally long. Accordingly, as earlier set forth new connections become difficult to place and old ones are difficult to remove because of wiring overlap and pileup, especially near the center of the frame lineup.

In a multistage terminal switch array the switching matrix may be laid out so that interstage wiring is either factory installed or installed in large multipair cables as each new frame section of terminal strips is added. The only manual connections required are those which set paths within the small individual switches stage by stage, and these are very short — hence easy to place and remove. Of greater significance is that the amount of manual labor per new connection added remains essentially constant as the overall network size increases. This is in marked contrast with the prior art distributing frame arrangement wherein the labor charge per new connect or disconnect operation grows rapidly as the frame size increases.

In the illustrative embodiment as shown in FIG. 3 a five-stage distributing network layout with $K$=30 paths between every inlet-outlet pair is shown in block form. The provision for the interconnection of 405,000 terminations renders the illustrative embodiment suitable for use as a facility in a very large wire center. As is apparent from that set forth herein, numerous other network arrangements using a lesser or greater number of stages may be provided employing the principles of our invention in order to satisfy specific local requirements. The stage-to-stage switch size parameters are chosen to satisfy two constraints.

1. First-trial congestion probability would be minimal at maximum terminal fill;

2. The selected size range would encompass an extremely large wire center; yet the design is economical for intermediate-size wire centers (cable terminals).

The first contraint is met by providing a tolerable level of congestion between individual cable and terminal pairs; the actual congestion can be made arbitrarily small in nearly all cases, by simply picking a new cable and/or equipment pair when congestion occurs. Alternately, if lower "first-trial" congestion is desired, a small reduction in terminal fill will reduce blocking substantially. The second constraint has been explained: i.e., the distributing frame problem is primarily a "large multientity building" problem.

The growth plan for the 5-stage array is as follows. Space is left for the center stage of switching to be "builtout" to the 30 × 30 switch size; only 10 × 10 terminal blocks need be installed at the smallest size. The 1st and 2nd stage primary-secondary arrangements, as well as the 4th and 5th stage matrices, are installed one at a time and cabled to the center stage as needed. Thus, no rearrangement of internal cabling is required during growth, nor is it necessary to take down any existing connections. Switch sizes in the several stages have been selected so as to minimize the required terminal hardware at the maximum size for the total array: 405,000 × 405,000 terminals.

FIG. 4 illustrates the growth plan for this five-stage network, along with a terminal count that can be used to compute physical size for various possible hardware implementations. A typical three-stage layout and its growth plan are also shown in FIG. 4. A three-stage network may advantageously be employed in wire centers that are projected to grow only to a moderate size.

As earlier noted, the multistage distributing network arrangement set forth herein integrates the concepts of computer administration and manual switch operation. Multistage networks in general, and that which is disclosed herein in particular, demand specific and repetitive logic functions to locate and select paths. As presently well known in the art, stored program path hunt and selection are readily applicable to these functions. Thus, as illustrated by circuit blocks 107 and 108 in FIG. 1, a computer system's core and disc memory is well adapted to the path memory function. It is also to be recognized that audit programs that can check any subset of existing paths, or print out periodically the entire map of established paths, are also logical expedients to incorporate in the associated computer arrangement in view of the 2-sided symmetrical distributing network designs referred to herein.

Although manual operation of the switching matrix remains an integral part of the arrangement set forth in the illustrative embodiment, it is clear that the investment in labor will be substantially less than in the prior art. The attendant will receive a carefully organized printout, indicating exactly which inlet-outlet pairs are to be cross-connected in each of the several switching stages. Depending on office size, the attendant may receive several such print-out "orders" before going to the actual switch frames to place and/or remove switch cords.

In the switch frame layout for the illustrative 5-stage network the first and second switching stages would logically and advantageously be on one bay, the third stage on another bay, and the fourth and fifth stages together on a third bay. By employment of the well-known expedients of color-coding and block numbering the attendant will readily locate the individual switches and inlet-outlets, and then place short switch cords. Having established all first and second-stage connections on the list, he may then proceed similarly for the third stage switches, and finally the fourth and fifth-stage switches.

An apparent advantage of the computer control system is that a complete magnetic tape backup for the core-disc memory of connections may advantageously be kept, so that there is virtually no chance of losing records. In addition, a partial or complete audit — by class of connection, by switching stage, etc. — is possible at any time; thus the associated Assignment Bureau's records may be maintained accurately. Since an accurate record of network paths is maintained in memory, it is also possible to further reduce the total labor effort by leaving in unused connections for later assignment in subsequent interconnections.

While the equipment of our invention has been described with reference to a particular embodiment wherein a wire center serving a telephone switching system is modified by the serial insertion of a multistage manual switching network between the input appearance terminals and the output appearance terminals of a main distributing frame cross-connection field, it will be obvious to those skilled in the art that the principles set forth herein may be applied in numerous other arrangements without departing from the spirit and scope of the invention.

For example, the invention may be employed in any environment which necessitates the provision of large or complex cross-connection fields such as data processing systems.

What is claimed is:

1. In a switching system, a distributing frame cross-connection field comprising

- a plurality of terminal strips each comprising a plurality of terminals,
- a plurality of input circuits connected to a first group of terminals on certain said terminal strips,
- a plurality of output circuits connected to a second group of terminals on other said terminal strips, and
- a multistage manual switching network serially inserted between said input circuits and said output circuits comprising
  - a third group of terminals on said certain terminal strips,
  - a fourth group of terminals on said other terminal strips,
  - at least one intermediate stage of terminal strips comprising a fifth and a sixth group of terminals,
  - means connecting each terminal in said third group to a terminal in said fifth group in a predetermined pattern,
  - means connecting each terminal in said fourth group to a terminal in said sixth group in a predetermined pattern, and
  - manually settable means for interconnecting any set of said terminals in said first group and said third group, any set of terminals in said fifth and said sixth group, and any set of terminals in said fourth and said second group.

* * * * *